United States Patent [19]

Seki et al.

[11] Patent Number: 5,177,690
[45] Date of Patent: Jan. 5, 1993

[54] METHOD OF CREATING NC DATA FOR HOLE MACHINING

[75] Inventors: Masaki Seki; Takashi Takegahara, both of Tokyo; Masatoshi Nakajima, Yamanashi, all of Japan

[73] Assignee: Fanuc Ltd, Minamitsuru, Japan

[21] Appl. No.: 465,143

[22] PCT Filed: Jun. 16, 1989

[86] PCT No.: PCT/JP89/00606

§ 371 Date: Feb. 23, 1990

§ 102(e) Date: Feb. 23, 1990

[87] PCT Pub. No.: WO89/12853

PCT Pub. Date: Dec. 28, 1989

[30] Foreign Application Priority Data

Jun. 24, 1988 [JP] Japan ............... 63-156301

[51] Int. Cl.⁵ .......................... G05B 19/18
[52] U.S. Cl. .................. 364/474.27; 364/474.22; 364/188; 364/191
[58] Field of Search ............ 364/191, 192, 474.22, 364/474.23, 474.25, 474.26, 474.27, 474.21, 188, 189

[56] References Cited

U.S. PATENT DOCUMENTS

| | | | |
|---|---|---|---|
| 4,433,373 | 2/1984 | Miller | 364/474.23 |
| 4,530,046 | 7/1985 | Munekata et al. | 364/474.21 |
| 4,799,143 | 1/1989 | Tanaka et al. | 364/191 |
| 4,823,255 | 4/1989 | Tanaka et al. | 364/191 |
| 4,926,311 | 5/1990 | Matsumura et al. | 364/191 |

Primary Examiner—Jerry Smith
Assistant Examiner—Paul Gordon
Attorney, Agent, or Firm—Staas & Halsey

[57] ABSTRACT

Any hole shape pattern (HPT) and a machining procedure thereof are specified in dialog fashion and these are registered in a hole-type file (FLD) as a single item of hole-type data. In a case where the registered hole type is designated by a keyboard (14) in the creation of NC data for hole machining, an automatic programming unit (11) causes a dialog screen conforming to the hole type to be displayed on a CRT (13). Hole shape dimensions and tools used in each machining process are specified, and NC data for hole machining is created based on this data.

2 Claims, 9 Drawing Sheets

FIG. 6

```
** HOLE-TYPE REGISTRATION **
   MACHINING PROCEDURE
(i) CENTER DRILLING  [YES]
                         1st STEP        2nd STEP
(ii) MACHINING TYPE    4. SPOT FACING   2. DRILLING
(iii) FINISHING ALLOWANCE    NO             NO
(iv) COUNTERSINKING         YES            YES TYPE OF MACHINING
      1. CENTER DRILLING    6. BORING
      2. DRILLING           7. BACK BORING
      3. COUNTERSINKING     8. REAMING
      4. SPOT FACING        9. TAPPING
      5. DEEP SPOT FACING  10. TRUE CIRCULAR CUTTING
```

- M1 — (i) PERFORM CENTER DRILLING? (YES/NO)
- M2 — (ii) WHAT IS MACHINING TYPE?
- M3 — (iii) DESIGNATE FINISHING ALLOWANCE? (YES/NO)
- M4 — (iv) PERFORM COUNTERSINKING? (YES/NO)

CRT

FIG. 7
*MACHINING DEFINITION*   HOLE TYPE :   01-28
1. DRILLED HOLE
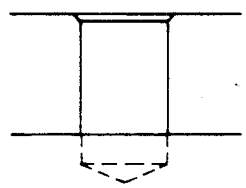
2. REAMED HOLE
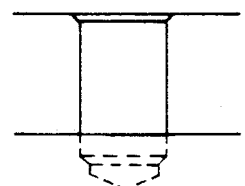
3. BORED HOLE 1
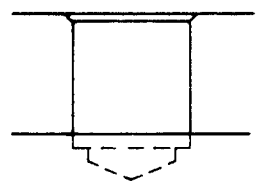
4. BORED HOLE 2
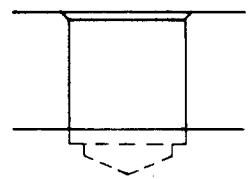
5. TWO-STEP DRILLED HOLE
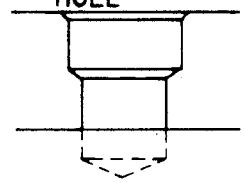
6. TWO-STEP BORED HOLE
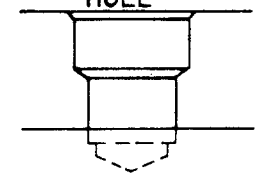
NO. = __
K0 : TURN PAGE ( BACK )
K1 : TURN PAGE ( AHEAD )
CRT

FIG. 8

```
* * MACHINING DEFINITION * *
                              SHAPE : DRILL-5 ( TWO-STEP
                                      DRILLED HOLE )
MACHINING HOLE    MACHINING
06         MACHINING PROCEDURE       TOOL USED

PROCESS 01  CENTER DRILLING           # 0302   φ1.5
PROCESS 02  SPOT FACING               # 0505   φ20
PROCESS 03  COUNTERSINKING (1st STEP) # 0605   φ30
PROCESS 04  DRILLING                  # 0480   φ12
PROCESS 05  COUNTERSINKING (2nd STEP) # 0600   φ18
```

CRT

METHOD OF CREATING NC DATA FOR HOLE MACHINING

FIELD OF THE INVENTION

This invention relates to a method of creating NC data for hole machining and, more particularly, to a method of specifying the type of hole to be machined and creating hole machining NC data in dialog fashion.

DESCRIPTION OF THE RELATED ART

A dialog-type numerical control apparatus is available in which a dialog screen and a function key screen are displayed on a display unit in accordance with each step of a plurality of data input steps, a predetermined function key (soft key) on the function key screen is pressed to thereby execute processing corresponding to the function key, and an NC program for hole machining is created using data inputted while referring to the dialog screen.

A dialog-type numerical control apparatus of this kind, which will be described with reference to FIG. 9, successively displays predetermined dialog screens on a display screen in accordance with the following steps:

(1) a first step of selecting execution of "AUTO-MATIC PROGRAMMING";
(2) a second step of performing initial settings such as the setting of workpiece material and coordinate systems;
(3) a third step of selecting the next step to be executed (e.g., "MACHINING DEFINITION", "NC DATA CREATION", "END", etc.);
(4) a fourth step of selecting the type of machining (surface machining, drilling, etc.);
(5) a fifth step of entering the hole type and hole dimensions in the case of drilling;
(6) a sixth step of editing an automatically decided drilling process with regard to a defined hole shape;
(7) a seventh step of defining the hole position; and
(8) an eighth step of creating NC data.

An operator responds to the dialog screens by entering the necessary data from a keyboard. Finally, an NC program (NC data) for hole machining is created using the entered data.

By way of example, in a case where a drilled hole (displayed in the form of a solid line) shown in FIG. 10 is machined, the drilled hole is selected from preregistered hole types and hole dimensions (hole diameter D and depth L) are decided at the fifth step, whereupon the machining processes [e.g., "PROCESS 01: CENTER DRILLING" (displayed in the form a broken line), "PROCESS 02: DRILLING"] are automatically decided by the system. Thereafter, if hole position is defined at the seventh step and NC data creation is designated, NC data for drilled hole machining will be created automatically.

However, in the conventional dialog-type input automatic programming apparatus, hole machining NC data can be created in accordance with the foregoing steps using only the predetermined hole types and machining procedures. Consequently, if it is desired to create NC data for machining a hole having an arbitrary hole shape not registered in advance, the operation for creating the NC data is a troublesome one. For example, a hole shape HOL shown in FIG. 11 has an arbitrary shape which is a combination of a spot facing hole SPF and a drilled hole DRL. In order to create NC data for machining this hole shape HOL, it is necessary with the conventional practice to repeat the processing of the fourth to seventh steps with regard to the spot facing hole SPF and again with regard to the drill hole DRL. As a result, a great amount of time is required for the data creating operation.

Accordingly, an object of the present invention is to provide a hole machining NC data creation method whereby any hole shape or machining procedure can be added or modified as a hole type, and NC data for machining a hole having any hole shape can be created with ease by specifying the hole type.

SUMMARY OF THE INVENTION

In the method of the invention for creating NC data for hole machining, any hole shape pattern and a machining procedure thereof are entered in dialog fashion and these are registered as a single item of hole-type data in a hole-type registration mode. In a case where the registered hole type is designated as the hole type in the creation of NC data for hole machining, a dialog screen conforming to the hole type is displayed using the hole-type data, and hole machining NC data is created using hole shape dimensions, tools used, etc., entered in accordance with the dialog screen.

BRIEF DESCRIPTION OF THE DRAWINGS

FIG. 6 is a dialog screen for deciding machining processes in hole-type registration processing;

FIG. 7 is a dialog screen for selecting hole type in NC data creation processing for hole machining;

FIG. 8 is a dialog screen showing correspondence between hole machining processes and tools used;

DESCRIPTION OF THE PREFERRED EMBODIMENTS

Figure 1:
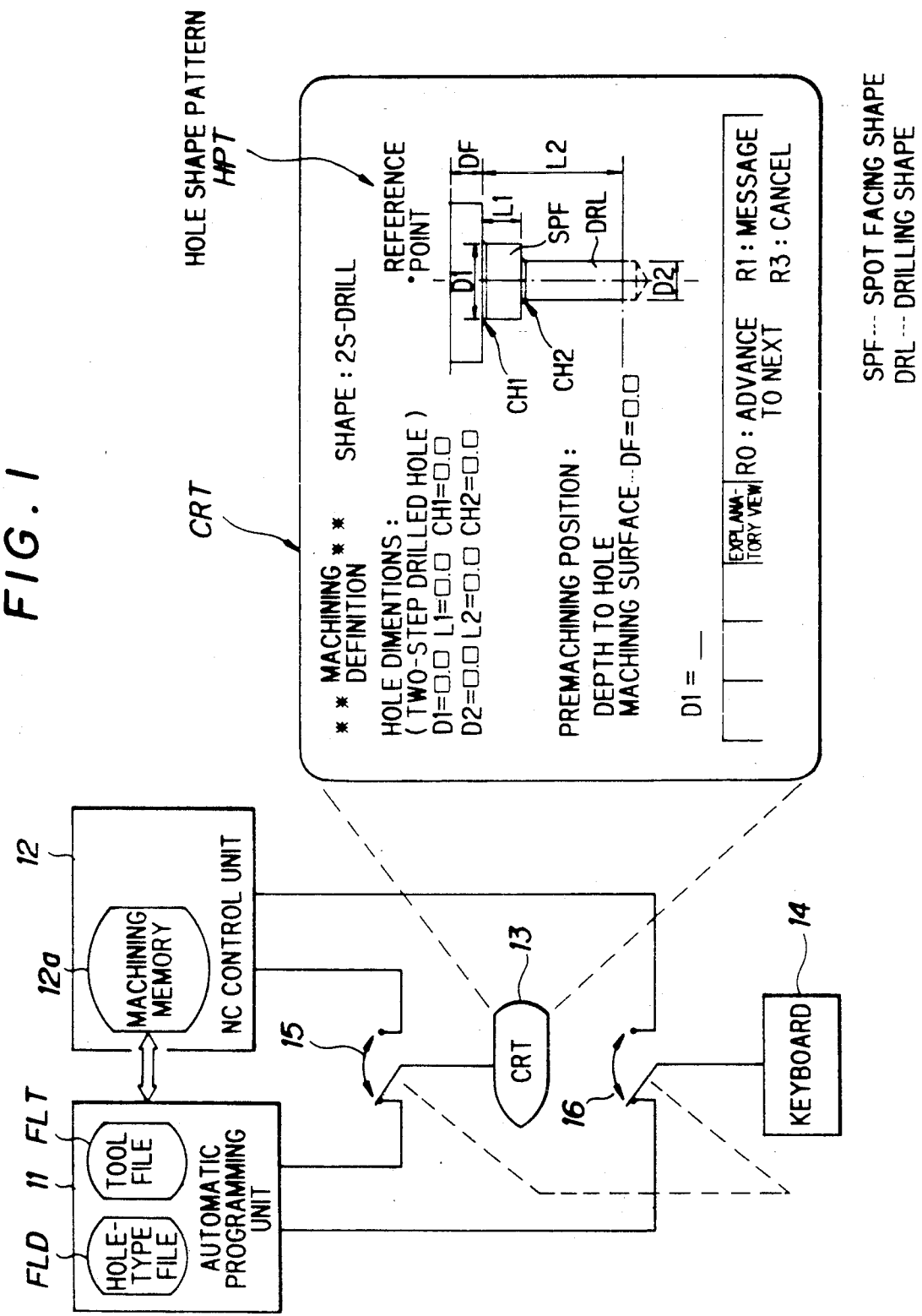
FIG. 1 is a block diagram of a dialog-type numerical control apparatus having an automatic programming function for practicing the present invention.

FIG. 1 is a block diagram of a dialog-type numerical control apparatus having an automatic programming function for practicing the present invention.

Numeral 11 denotes an automatic programming unit, 12 an NC control unit, 13 a graphic display unit (CRT), 14 a keyboard, and 15, 16 changeover units. The changeover units 15, 16 are illustrated in the form of switches for the sake of description. In actuality, however, changeover is effected by software processing.

The automatic programming unit 11 and NC control unit 12 are of microcomputer construction and incorporate a processor (CPU), a control program memory (ROM) and a RAM. A hole-type file FLD and a tool file FLT are stored in the RAM of the automatic programming unit 11.

The graphic display unit 13 and keyboard 14 are integrated into a single unit usually referred to as a CRT/MDI unit.

Figure 2:
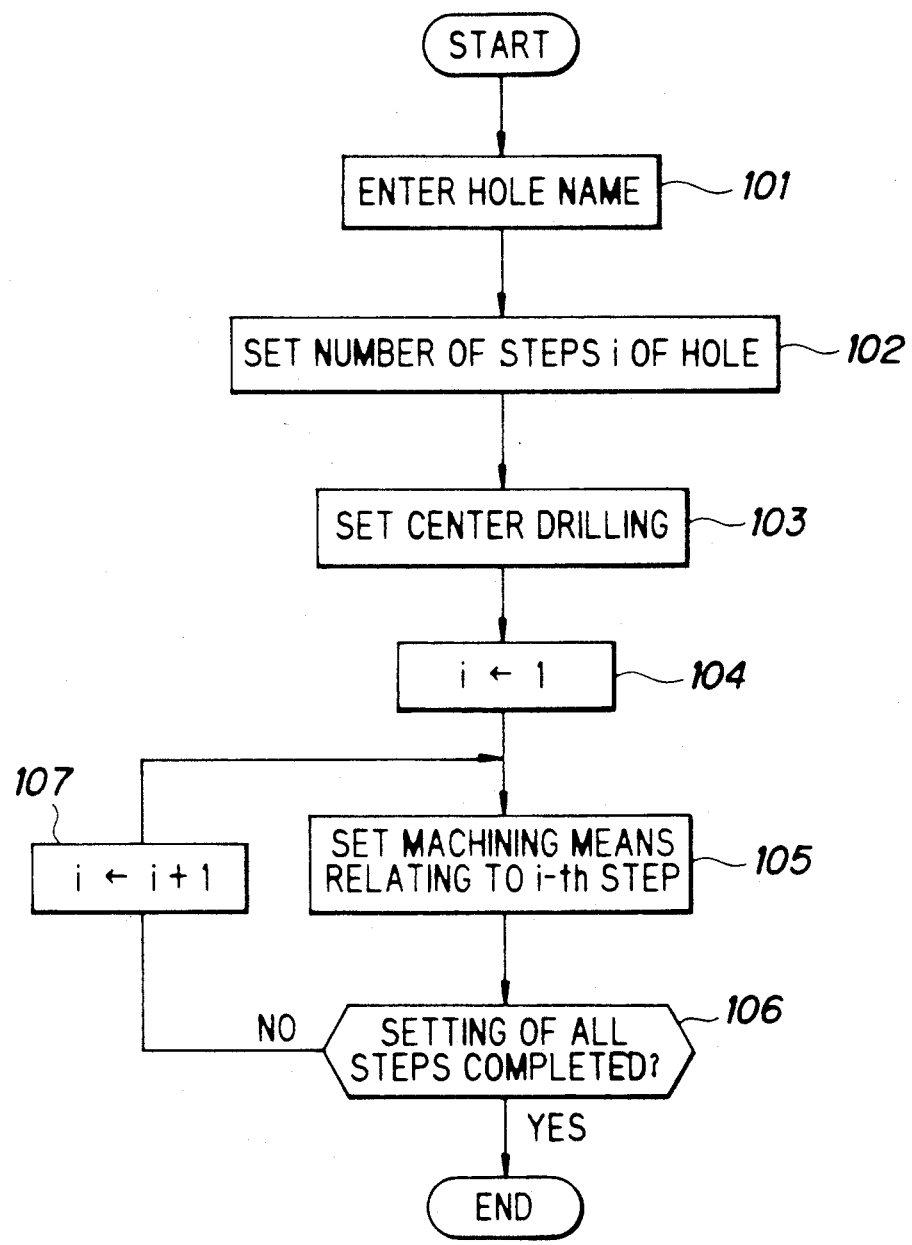
FIG. 2 is a flowchart of hole-type registration processing according to the present invention.
Figure 3:
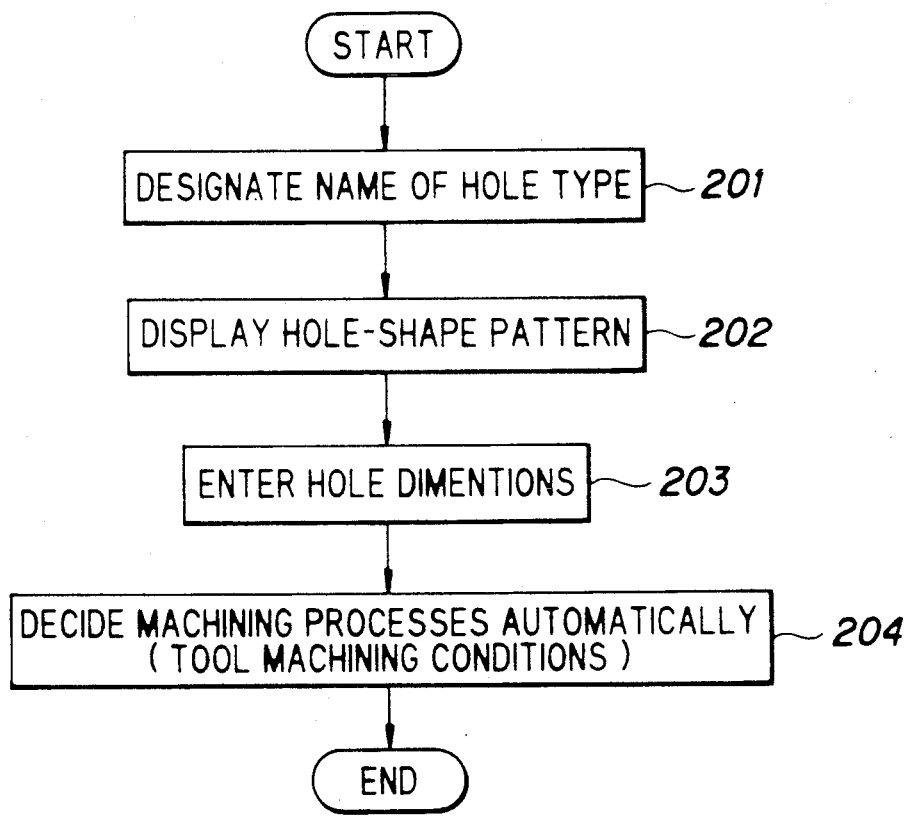
FIG. 3 is a flowchart of hole machining definition processing according to the present invention.
Figure 4:
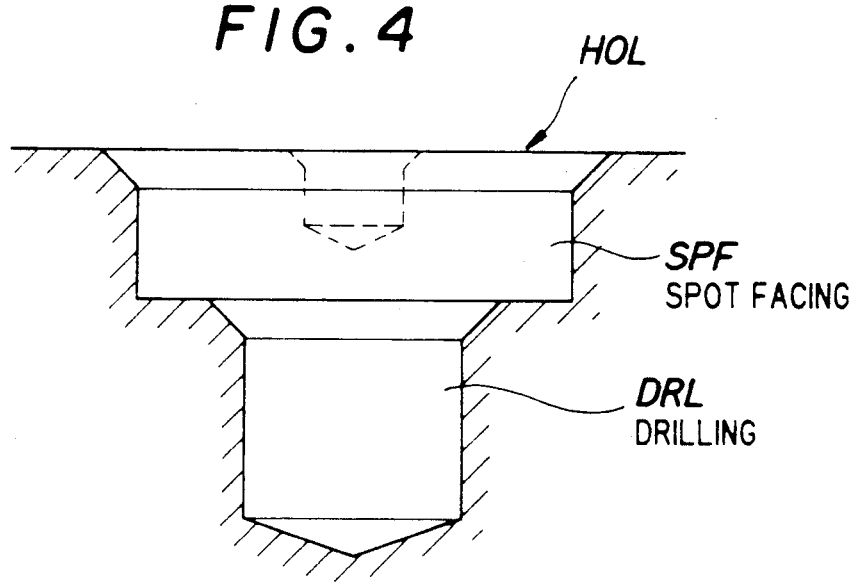
FIG. 4 is a diagram of a hole shape showing a two-step drilled hole.

FIG. 2 is a flowchart of hole-type registration processing according to the present invention, and FIG. 3 is a flowchart of hole machining definition processing according to the present invention. In section A, hole-type registration processing for the hole shape HOL shown in FIG. 4 will be described in line with the flowchart of FIG. 2. In section B, machining definition processing for the hole shape HOL will be described in line with the flowchart of FIG. 3. It is assumed that the changeover units 15, 16 have already been changed over to dedicate the graphic display unit 13 and keyboard 14 to the automatic programming unit 11.

A. HOLE-TYPE REGISTRATION PROCESSING

Figure 5:
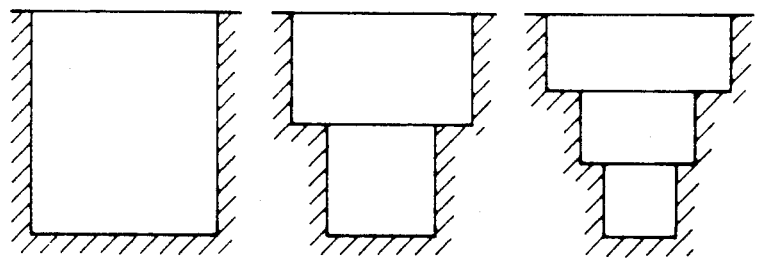
FIG. 5 is a dialog screen for setting the number of hole steps in hole-type registration processing.

The operator calls the dialog screen of the hole-type registration processing mode by a predetermined key operation and first enters the name of the hole type (e.g., "TWO-STEP DRILLED HOLE") using the keyboard 14 (step 101). When this is done, the processor displays the dialog screen shown in FIG. 5 and displays a message inquiring about the number of steps possessed by the type of hole to be registered. Accordingly, the operator responds to the message by setting two steps as the number of hole steps (step 102).

When this has been accomplished, the dialog screen changes over to one (FIG. 6) for entering the machining procedure for the hole type, and a message M1 is displayed inquiring whether center drilling is to be performed in the initial machining process. If center drilling is to be performed, then "YES" is entered; if not, "NO" is entered. The processor stores "PROCESS 01: CENTER DRILLING" if "YES" is entered. If "NO" is entered, however, the next entered machining process becomes "PROCESS 01" without center drilling being set (step 103).

Next, the processor performs the operation 1→i (step 104) and messages M2–M4 relating to machining of an i-th step are successively displayed. For example, if the type of machining of an i-th step is spot facing, then "4. SPOT FACING" is entered by referring to the machining-type data in the dialog screen. Next, "NO" is entered in response to message M3 regarding whether there is a finishing allowance, then "YES" is entered in response to message M4 regarding whether countersinking is required. When this has been accomplished, the processor stores "PROCESS 02: SPOT FACING", and "PROCESS 03: COUNTERSINKING" (step 105). Next, it is determined (step 106) whether setting has been completed for all of the number of steps set at step 102. If setting has not been completed, then the operation i + 1→i is performed and processing from step 105 onward is repeated. In the illustrated example, the machining procedure for drilling is entered.

When setting has been completed with regard to all of the number of steps, the hole shape pattern and machining procedure defined in accordance with steps 102 through 107 are registered in the hole-type file FLD as hole-type data having the hole-type name "TWO-STEP DRILL HOLE", and hole-type registration processing is terminated.

B. HOLE MACHINING DEFINITION PROCESSING

Figure 9:
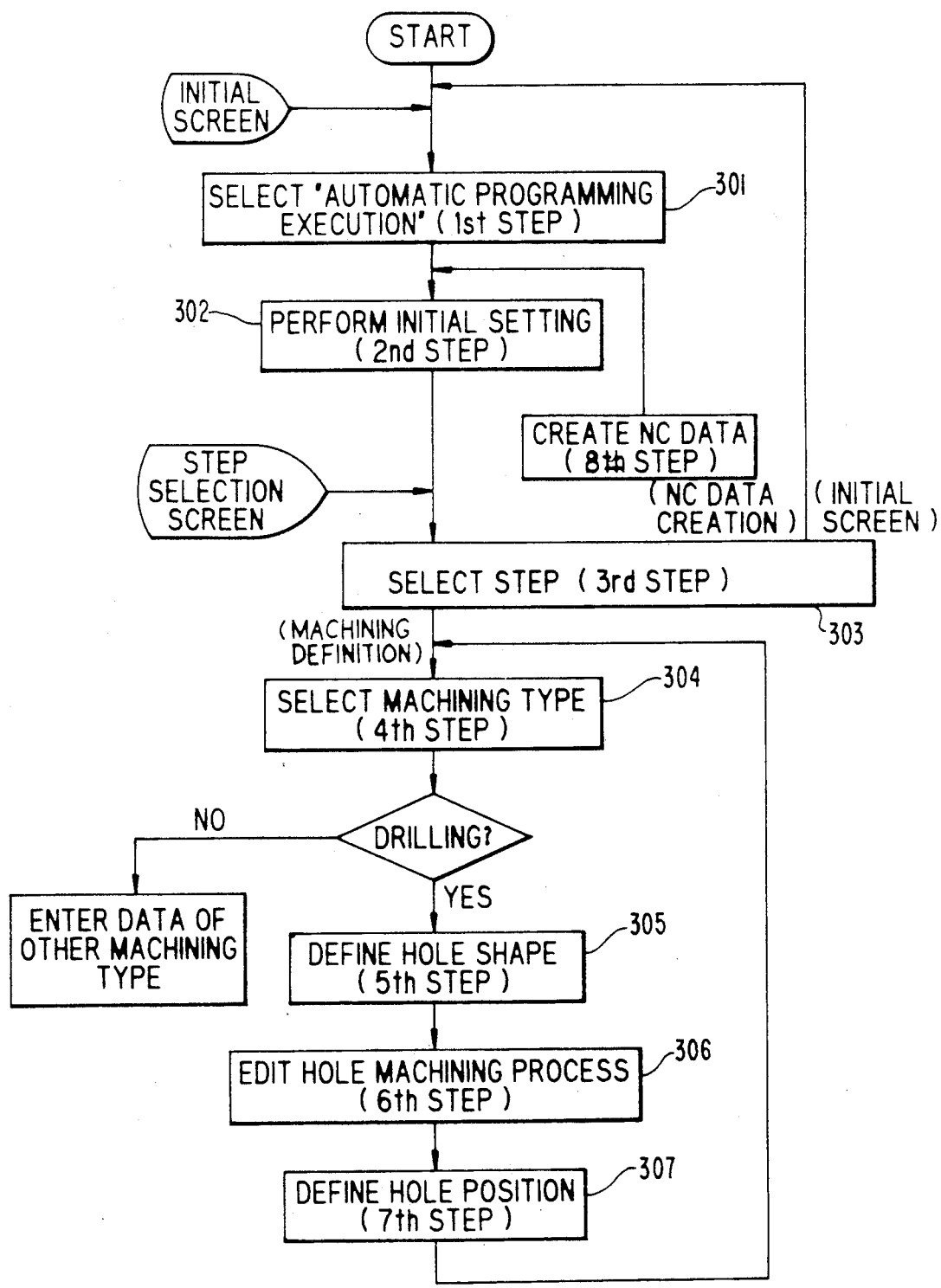
FIG. 9 is a flowchart of NC data creation processing for hole machining.
Figure 10:
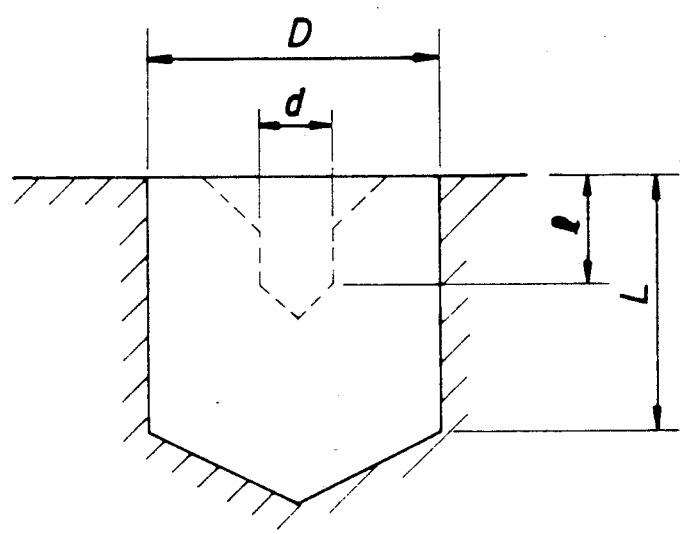
FIG. 10 is a diagram of drilled hole shape.
Figure 11:
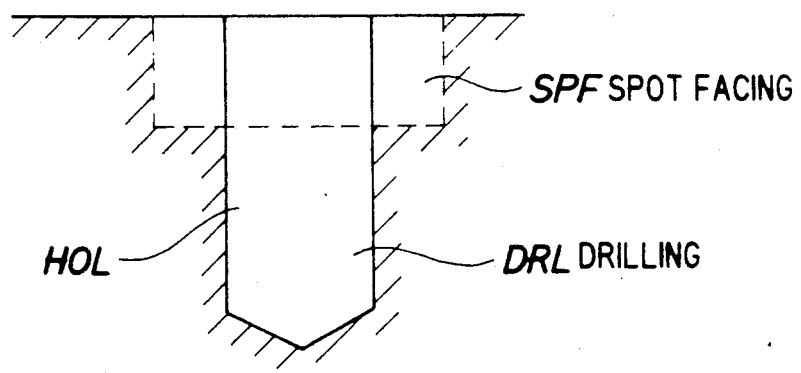
FIG. 11 is a diagram of an arbitrary hole shape.

In creating NC data for hole machining, data entry in each step is performed by the automatic programming function in dialog fashion just as in the flow of the conventional method shown in FIG. 9. "MACHINING DEFINITION" is selected in the step selection (FIG. 9, third step), and then "DRILLING" is selected in the selection of machining type (fourth step).

Owing to selection of "DRILLING", a menu of hole types (FIG. 7) is displayed. Accordingly, a prescribed hole type (e.g., "5. TWO-STEP DRILLED HOLE") is selected from this menu (step 201). When this has been done, the processor calls the file for the two-step drilled hole registered in the hole-type file FLD, and the hole shape pattern HPT as well as various messages is displayed on the dialog screen (the CRT screen of FIG. 1, step 202).

Accordingly, the dimensions of the spot facing and the countersinking of the first step and the dimensions of the drilled hole and the countersinking of the second step are entered in conformity with the hole shape pattern HPT on the abovementioned dialog screen (step 203). When this has been accomplished, the processor automatically determines, and displays on the CRT screen, the machining processes of the two-step drilled hole registered in the hole-type file FLD as well as the tools used in the machining processes in accordance with the machining process sequence, with the tools being decided from the tool file FLT (FIG. 8, step 204).

Thereafter, machining process editing (FIG. 9, sixth step) and hole position definition (seventh step) are performed just as in the background art, and hole machining definition processing is terminated.

Thus, in accordance with the present invention, any hole shape pattern and a machining procedure thereof are entered in dialog fashion and these are registered as a single item of hole-type data. In a case where the registered hole type is designated in the creation of NC data for hole machining, a dialog screen conforming to the hole type is displayed, and hole machining NC data is created upon specifying hole shape dimensions, tools used, etc. Accordingly, any hole shape and machining procedure can be registered as a hole type, and NC data for machining a hole having any hole shape can be created quickly and easily by designating the hole type.

We claim:

1. A hole machining NC data creation method in which dialogue screens for creating NC data for hole machining are prepared in dependence upon a type of hole, a selected hole type to be machined is specified to thereby display the dialogue screen conforming to the selected hole type and NC data for hole machining is created by defining and entering hole shape dimensions and tools used in each machining process in accordance with the dialogue screen, said method comprising the steps of:

(a) entering any hole shape pattern and a machining procedure thereof in dialogue fashion and storing the hole shape pattern and the machining procedure as one item of hole-type data in a hole-type registration mode, said entering of hole-type data including the steps of:
   (a1) inputting a hole-type name;
   (a2) inputting a number of steps in the hole shape pattern;
   (a3) inputting a response to an inquiry as to whether center drilling is to be carried out initially; and
   (a4) inputting a response to an inquiry with regard to a machining procedure for each step of the hole shape pattern;

(b) displaying, in a case where the hole shape pattern entered in step (a) is designated as a selected hole type in creating NC data for hole machining, a dialogue screen conforming to the selected hole type using the hole-type data entered in step (a); and
(c) creating NC data for hole machining using the hole shape dimensions entered in step (a).

2. A hole machining NC data creation method according to claim 1, wherein step (c) comprises:
  (c1) displaying, on a display screen, hole shape patterns of various hole types which include the hole shape pattern defined in steps (a) and (b);
  (c3) entering hole shape dimensions upon displaying a dialogue screen for shape entry of the desired pattern.

* * * * *

UNITED STATES PATENT AND TRADEMARK OFFICE
CERTIFICATE OF CORRECTION

PATENT NO. : 5,177,690

DATED : January 5, 1993

INVENTOR(S) : Seki et al.

It is certified that error appears in the above-identified patent and that said Letters Patent is hereby corrected as shown below:

On the title page, item:

[54] Title of Invention should be --METHOD OF CREATING NC DATA FOR HOLE MACHINING--.

Col. 6, after line 5, insert the following new line:
--(c2) designating a hole type by selecting a desired pattern; and--.

Signed and Sealed this

Thirtieth Day of November, 1993

Attest:

BRUCE LEHMAN

Attesting Officer

Commissioner of Patents and Trademarks